United States Patent [19]

Vestergaard

[11] 3,989,672

[45] Nov. 2, 1976

[54] PROCESS FOR PREPARING AROMATIC CARBONATE POLYMERS

[75] Inventor: Jorgen Helm Vestergaard, Brasschaat, Belgium

[73] Assignee: General Electric Company, Pittsfield, Mass.

[22] Filed: Sept. 23, 1974

[21] Appl. No.: 508,110

Related U.S. Application Data

[63] Continuation-in-part of Ser. No. 302,252, Oct. 30, 1972, abandoned, which is a continuation-in-part of Ser. No. 28,102, April 13, 1970, abandoned.

[52] U.S. Cl. .............................. 260/47 XA
[51] Int. Cl.² ........................... C08G 63/62
[58] Field of Search ..................... 260/47 XA

[56] References Cited
UNITED STATES PATENTS 2,970,131  1/1961  Moyer et al. .................... 260/47 XA
3,291,774  12/1966  Bolgiano ........................ 260/47 XA

FOREIGN PATENTS OR APPLICATIONS 878,115  9/1961  United Kingdom ............ 260/47 XA
1,017,987  1/1966  United Kingdom ............ 260/47 XA Primary Examiner—Wilbert J. Briggs, Sr.
Attorney, Agent, or Firm—Donald M. Papuga; William F. Mufatti

[57] ABSTRACT

A process for preparing a polycarbonate having improved resistance to thermal degradation and improved impact resistance by reacting a carbonate precursor such as phosgene with a dihydric phenol such as bisphenol-A in an aqueous medium while adding sufficient alkali metal hydroxide to maintain a pH of between 8.0 and 10.2 during the entire reaction.

5 Claims, No Drawings

PROCESS FOR PREPARING AROMATIC CARBONATE POLYMERS

This Patent Application is a continuation-in-part of U.S. Patent application Ser. No. 302,252, filed Oct. 30, 1972 and now abandoned, which in turn is a continuation-in-part of U.S. Patent application Ser. No. 28,102, filed Apr. 13, 1970, now abandoned.

This invention is directed to a process for preparing aromatic carbonate polymers having improved properties of thermal stability and impact resistance.

BACKGROUND OF THE INVENTION

In recent years a great deal of effort has been expended in the area of polycarbonates in order to improve both physical and mechanical properties. Much, if not all, of this effort as disclosed by the below art has been directed to incorporating various additives as a means of improving such properties as thermostability, resistance to discoloration, greater impact resistance, melt viscosity stability, resistance to degradation of the polycarbonate, and various other properties. In fact, some of the art has been directed to controlling molecular weight as a means of providing at least uniform properties from batch to batch or in a continuous process for preparing polycarbonates. However, this control of molecular weight alone does not provide for improved properties.

Specifically, U.S. Pat. Nos. 2,970,131 and 3,173,891 disclose controlling the molecular weight of the polycarbonate from batch to batch. Both references clearly disclose that the pH of the reaction medium is maintained between 10.5 to about 11.5.

Control of molecular weight, which is well recognized in the polymer arts, is important and necessary in polymerization reactions in order to achieve from batch to batch the same polymer having essentially the same properties. However, this alone is not the total answer to achieve improved properties of resistance to thermal degradation and improved impact resistance. It has been determined that in addition to molecular weight control from batch to batch, there is a need to control the polydispersity index within each batch, since when controlling the polydispersity index or keeping it as low as possible, excellent properties within each batch is achieved. polydispersity index is the ratio of the weight average molecular weight to the number average molecular weight. By maintaining this ratio as low as possible and actually in the range of 2.0 to 3.0, improved properties are achieved.

DESCRIPTION OF THE INVENTION

It has now been surprisingly discovered that controlling the process conditions when preparing a polymer in an aqueous caustic system produces a polycarbonate having improved properties as well as a polymer having a polydispersity index of between 2.0–3.0. This is surprising in itself because it does not require the need for additives as a way of improving the properties of a polycarbonate material. As is well known in the art, additives to benefit one property can cause degradation of some other property of the material. Therefore, in the practice of this invention, by merely controlling the pH of the system during the reaction to prepare the polycarbonate resin produces a polycarbonate having improved properties such as melt viscosity stability and improved impact resistance.

This invention is directed to a process for preparing an aromatic carbonate polymer having improved properties which process consists of phosgenating a dihydric phenol such as 2,2-bis(4-hydroxyphenyl) propane (hereinafter referred to as bisphenol-A) in an aqueous medium which contains a solvent for the polycarbonate, a catalyst and a molecular weight regulator. Simultaneously with the phosgenation, sufficient alkali metal hydroxide solution is added to maintain the pH between 8.0 and 10.2.

PREFERRED EMBODIMENT OF THE INVENTION

The following examples are set forth to illustrate more clearly the principles and practices of this invention to those skilled in the art. Unless otherwise specified, where parts are mentioned, they are parts by weight.

EXAMPLE I 37.2 gallons of distilled water are placed in a reaction kettle equipped with an agitator, reflux condenser, pH electrodes and means for adding phosgene and sodium hydroxide solution. 200 pounds of bisphenol-A, 2200 grams of p-tertiarybutyl phenol, and 700 milliliters of triethylamine are then added to the kettle. The contents are agitated for 10 minutes and then 60 gallons of methylene chloride are added to the mixture. The pH is 9.0.

To the above mixture, 100 pounds of phosgene is then added over a period of about 1 hour. Simultaneously therewith a 50 percent aqueous sodium hydroxide solution is metered into the reaction at a rate sufficient to maintain the pH at 9.0.

When the phosgene and sodium hydroxide solution addition is complete, the polycarbonate resin formed by the reaction is present as a solution in methylene chloride. This solution is then washed and the resin is recovered from the solution by filtration and centrifugation.

The polycarbonate so obtained herein is designated as A, and is found to have a polydispersity index of 2.90 as determined by Gel Permeation Chromatography. The polydispersity index is the ratio of the weight average molecular weight to the number average molecular weight $M_w/M_n$.

EXAMPLE II

Example I is repeated except that the pH is maintained at about 8.7.

The polycarbonate so obtained herein is designated as B and found to have a polydispersity index of 2.80.

EXAMPLE III

Example I is repeated except that the pH is maintained at 10.2.

The polycarbonate so obtained herein is designated as C and is found to have a polydispersity index of 3.00.

EXAMPLE IV

Example I is repeated except that the pH is maintained at 11.2.

The polycarbonate so obtained herein is designated as D and the polydispersity index is found to be 3.8.

EXAMPLE V

Each one of the polycarbonate resins of Examples I – IV are analyzed for melt viscosity measured in poise using a Capillary Rheometer at 600° F in a nitrogen atmosphere at a sheer stress of 13.2 psi gauge. The melt viscosity is determined over a period of 20 minutes and the change in the melt viscosity over such period is noted. The smaller the difference in melt viscosity as measured in poise, the less is the degradation of the resin. The results are as follows:

| TEST SAMPLE | 5 MIN. | 10 MIN. | 15 MIN. | 20 MIN. | POISE |
|---|---|---|---|---|---|
| A | 2410 | 2340 | 2320 | 2280 | 130 |
| B | 2060 | 2060 | 2030 | 2030 | 30 |
| C | 4430 | 4340 | 4190 | 4130 | 300 |
| D | 4250 | 4010 | 3790 | 3680 | 570 |

EXAMPLE VI

The polycarbonate resin of Examples I through IV, namely A through D, are injection molded at about 525° F into test specimens of 4 inches in diameter by ⅛ inch thick.

The samples are aged in an air circulating oven for 6 months at 125° C. The test specimens are then tested for impact resistance by the drop ball method which consists of dropping a 25-pound weight equipped with a 1 inch diameter ball on the end thereof onto the center of the test specimen which is supported on a flat surface with a 3 inch diameter hole in the center of the flat surface. The energy required to break the specimens is calculated in foot pounds by multiplying the distance of drop in feet to cause breakage of the test specimen by the weight of the object being dropped. The maximum drop is a distance of 8 feet. The results are as follows:

A — did not break after dropping weight 24 times from maximum height

B — did not break after dropping weight 24 times from maximum height

C — did not break after dropping weight 24 times from maximum height

D — 8 foot pounds

Test specimens of the above polycarbonate resins are also tested for breaking before heat aging and all of the specimens A through D did not break upon repeated dropping of the weight from the maximum distance.

The instant invention is directed to a process for preparing an aromatic carbonate polymer having improved properties of thermal stability and impact resistance. These properties are achieved by the surprising discovery of merely controlling the process conditions. The instant invention consists of the process of preparing the polycarbonate resin by phosgenating a dihydric phenol in an aqueous caustic medium which contains therein a solvent for the polymer, a catalyst and a molecular weight regulator while simultaneously adding thereto sufficient alkali metal hydroxide solution to maintain a pH of between 8.0 and 10.2. The criticality of this instant invention is in maintaining the pH in the particular range set forth above in order to obtain an aromatic carbonate polymer having improved properties. It is interesting to note in the samples that when a polycarbonate resin is prepared in an aqueous caustic medium having a pH in excess of 11, the change in melt viscosity is considerably greater than the change in melt viscosity of the polycarbonate resins prepared by the process set forth in the instant invention wherein the pH is controlled between 8.0–10.2. This clearly shows that polycarbonate resins prepared by the process of the instant invention have greater stability resulting in retention of properties such as impact resistance as shown in Examples V and VI.

In the practice of this invention any dihydric phenol which contains as the sole reactive group two phenolic hydroxyl groups can be employed herein. Preferably, the dihydric phenols employed herein are bisphenols such as bis(4-hydroxyphenyl) methane, 2,2-bis(4-hydroxyphenyl) propane, 4,4-bis(hydroxyphenyl) heptane, etc.; and include those as disclosed in U.S. Pat. No. 3,028,365, which patent is hereby incorporated by reference. The preferred dihydric phenol to be employed in the practice of this invention is bisphenol-A (2,2-bis(4-hydroxyphenyl) propane).

The carbonate precursor employed in the practice of this invention can be either carbonyl halide or haloformate. The carbonyl halides which can be employed herein are carbonyl bromide, carbonyl chloride, carbonyl fluoride, etc. or mixtures thereof. The haloformates suitable for use herein include bis-haloformates of dihydric phenol (bischloroformates of hydroquinone, etc.) or glycols (bis-haloformates of ethylene glycol, neopentyl glycol, polyethylene glycol, etc.). Although the carbonate precursors will occur to those skilled in the art, carbonyl chloride, also known as phosgene, is preferred.

The molecular weight regulators which can be employed in carrying out the process of this invention for preparing the aromatic carbonate resins can be such molecular weight regulators as phenol, cyclohexanol, methanol, paratertiarybutylphenol, parabromophenol; monofunctional organic acids, that is benzoic acid, acetic acid; and monofunctional alcohols such as methanol, ethanol. The amounts employed generally vary between 0.5 to about 4 weight percent, based on the weight of the dihydric phenol originally charged to the reaction mixtures.

The polymerization catalysts also employed herein can be any of the suitable catalysts that aid the polymerization of bisphenol-A with phosgene. Suitable catalysts are tertiary amines such as, for example, triethylamine, tripropylamine, n,n-dimethylaniline, quaternary ammonium compounds such as, for example, tetraethylammonium bromide, cetyl triethyl ammonium bromide, tetra-n-heptyl ammonium iodide, tetra-n-propyl ammonium bromide, tetramethyl ammonium hydroxide, tetra-n-butyl ammonium iodide, benzyltrimethyl ammonium chloride and quaternary phosphonium compounds such as, for example, n-butyl-triphenyl phosphonium bromide and methyltriphenyl phosphonium bromide.

The alkali metal hydroxide employed in the practice of this invention can be any of the alkali metal hydroxides selected from the group consisting of the alkali group and earthalkali groups. Specifically, these include potassium hydroxide, sodium hydroxide, lithium hydroxide, calcium hydroxide and magnesium hydroxide.

The composition prepared by the process of this invention has utility in molding and extruding parts, sheets and films. Because of the optimum physical properties obtained by employing the unique process of the instant invention, the carbonate polymers prepared by the process have greater versatility in molding operations.

It will thus be seen that the objects set forth above among those made apparent in the preceding description are efficiently obtained and since certain changes may be made in carrying out the above process and the composition set forth without departing from the scope of the invention, it is intended that all matters contained in the above description shall be interpreted as illustrative and not in a limiting sense.

What is claimed is:

1. A process for preparing a carbonate polymer having improved resistance to thermal degradation and improved impact resistance, which process consists of reacting a carbonate precursor with 2,2-bis(4-hydroxyphenyl) propane in an aqueous medium containing sufficient alkali metal hydroxide to maintain a pH between 8.0–10.2 during the reaction.

2. The process of claim 1 which consists of (a) mixing 2,2-bis(4-hydroxyphenyl) propane in an aqueous medium containing a solvent for the carbonate polymer, a molecular weight regulator and a catalyst, (b) introducing a carbonyl halide into the reaction medium and (c) adding simultaneously with the carbonyl halide sufficient alkali metal hydroxide to maintain a pH between 8.0 and 10.2.

3. The process of claim 2 wherein the carbonyl halide is phosgene.

4. The process of claim 2 wherein the alkali metal hydroxide is sodium hydroxide.

5. The process of claim 2 wherein the catalyst is triethylamine.

* * * * *